United States Patent [19]

Minkov

[11] Patent Number: 4,563,327

[45] Date of Patent: Jan. 7, 1986

[54] LIQUID URANIUM ALLOY-HELIUM FISSION REACTOR

[75] Inventor: Vladimir Minkov, Skokie, Ill.

[73] Assignee: The United States of America as represented by the United States Department of Energy, Washington, D.C.

[21] Appl. No.: 620,308

[22] Filed: Jun. 13, 1984

[51] Int. Cl.[4] .................... G21C 1/24; G21C 3/52
[52] U.S. Cl. .................................................. 376/359
[58] Field of Search ............... 376/347, 354, 359, 368, 376/409, 463

[56] References Cited

U.S. PATENT DOCUMENTS

| | | | |
|---|---|---|---|
| 3,136,700 | 6/1964 | Poppendiek et al. | 376/359 |
| 3,386,886 | 6/1968 | Whittier. | |
| 3,447,321 | 6/1969 | Romero. | |
| 3,486,977 | 12/1969 | Geist | 376/359 |
| 3,494,829 | 2/1970 | Mialki et al. | 376/359 |
| 3,624,239 | 11/1971 | Fraas. | |
| 4,182,651 | 1/1980 | Fischer. | |
| 4,217,172 | 8/1980 | Mori et al. . | |
| 4,327,443 | 4/1982 | Cotton | 376/359 |

Primary Examiner—Charles T. Jordan
Assistant Examiner—Richard Klein
Attorney, Agent, or Firm—James W. Weinberger; Walter L. Rees; Judson R. Hightower

[57] ABSTRACT

This invention teaches a nuclear fission reactor having a core vessel and at least one tandem heat exchanger vessel coupled therewith across upper and lower passages to define a closed flow loop. Nuclear fuel such as a uranium alloy in its liquid phase fills these vessels and flow passages. Solid control elements in the reactor core vessel are adapted to be adjusted relative to one another to control fission reaction of the liquid fuel therein. Moderator elements in the other vessel and flow passages preclude fission reaction therein. An inert gas such as helium is bubbled upwardly through the heat exchanger vessel operable to move the liquid fuel upwardly therein and unidirectionally around the closed loop and downwardly through the core vessel. This helium gas is further directed to heat conversion means outside of the reactor vessels to utilize the heat from the fission reaction to generate useful output. The nuclear fuel operates in the 1200°–1800° C. range, and even higher to 2500° C., limited only by the thermal effectiveness of the structural materials, increasing the efficiency of power generation from the normal 30–35% with 300°–500° C. upper limit temperature to 50–65%. Irradiation of the circulating liquid fuel, as contrasted to only localized irradiation of a solid fuel, provides improved fuel utilization.

10 Claims, 2 Drawing Figures

LIQUID URANIUM ALLOY-HELIUM FISSION REACTOR

CONTRACTUAL ORIGIN OF THE INVENTION

The United States Government has rights in this invention pursuant to Contact No. W-31-109-ENG-38 between the U.S. Department and Energy and The University of Chicago representing Argonne National Laboratory.

BACKGROUND OF THE INVENTION

Conventional nuclear reactors provide for solid uranium oxide fuel elements and solid moderator or control elements each typically clad in stainless steel, titanium or other durable material. The solid fuel elements and solid moderator or control elements are confined in a core according to a specific matrix so that their relative presence determines when the reaction is critical and the extent or output power of the reaction. A coolant is cause to flow through the reactor core and over the fuel and control elements serving thereby to cool these elements. Using the same primary coolant or by a heat exchanger using also a second or different coolant, this heat of the reaction is transferred to a steam generator whereby steam is generated and directed through turbines or the like to produce electricity.

The outlet coolant temperatures from the reactor are normally maintained in the region below 500° C. and more typically 425° C. The inlet temperatures of the primary coolant to the reactor is typically in the 250° C. range. The effective atmospheric sink temperature is perhaps 25° C. The maximum thermal differential between the outlet coolant and heat sink temperatures is thus of the order of 400°–475° C., to provide a maximum thermal efficiency of the reactor plant of the order of 30–35%.

Taking into account further the limited efficiencies of the various physical components in the energy conversion chain, the overall electrical output compared against the thermal energy potential provides an overall efficiency more typically in the range of 20-25%.

The Mialki Pat. No. 3,494,829 proposes a homogeneous thermonuclear fission reactor having a melt formed of a combination of the fuel and moderator or control elements. In the confinement of a closed reactor vessel circuit, gas is bubbled through the melt and is then passed over heat exchanger means where a secondary fluid is used to transfer the heat of the reaction to exterior apparatus to generate useful mechanical or electrical output. Also, the heated melt surface radiates a considerable percentage of the heat to the overlying heat exchanger structure. The temperatures of the melt are in the 1000° to 2200° C. range per the disclosure of the patent. However, the homogeneous fuel-moderator melt does not provide accurate control demanded of power reactors, but instead the specific dimensions and materials of the core melt determine selected operating characteristics at a range of outputs.

The Whittier Pat. No. 3,383,886 uses a solid fissionable fuel and a liquid control moderator settled over the fuel, and gas is bubbled through the liquid moderator and over the fuel as a means for controlling the reactor output. The patent notes that the gas bubbles in the moderator modify the density of the moderator to change the ratio in the core of the moderator atom to the fuel atom; and as the ratio changes from a low value to a high value, the reactivity likewise changes—first increasing, then peaking and finally decreasing. The patent notes that the reactor is undermoderated at the low output condition and overmoderated at the higher output condition. The fission heat is transferred by means of the circulating liquid moderator first spilling over at the top of the reactor core, falling by gravity through a heat exchanger, and then being pumped back into the reactor core for continued movement throughout the closed loop system. The drawbacks of this concept are the need for a pump to operate at the high temperatures of the liquid moderator, and the contraneeded reduction in the cooling capacity of the reduced gas bubbling at the high output end of the control.

SUMMARY OF THE INVENTION

This invention relates to an improved nuclear fission reactor utilizing coupled reactor vessels and containing fissionable fuel in its liquid phase, and separate solid moderator or control elements that can be moved in one of the vessels to determine the reaction output, and means including a gas bubbled through the other vessels, operable to circulate the liquid fuel through the coupled reactor vessels and to transfer the reaction heat to the exterior of the reactor vessels for useful end purposes.

A basic object of this invention is to provide a nuclear fission reactor having high end operating temperatures generally in the 1200°–1800° C. range, and even higher to 2500° C. limited only by the effectiveness of the confining structural materials in containing such temperatures.

Another object of this invention is to provide a nuclear fission reactor using fissionable fuel in its liquid phase and solid control elements, and circulating the fuel over the control elements so as to provide improved utilization of the fuel in that different portions of the same are constantly being irradiated as contrasted to a solid fuel where there is only local irradiation of the fuel.

Another object of this invention is to provide a nuclear fission reactor of either the fast neutron or slow neutron type, operable by the choice of the fuel and control or moderator materials used, where in either type the fuel operating temperature is sufficiently high to be in its liquid phase.

A specific feature of this invention provides a reactor core vessel and at least one tandem or reactor heat exchanger vessel interconnected therewith across upper and lower passages to define a closed loop, where nuclear fuel in its liquid phase is held in these vessels, where solid control elements or moderators in the reactor core vessel are physically adjusted relative to one another to produce a controlled fission reaction of the liquid fuel proximate thereto, where an inert gas such as a helium is bubbled upwardly through the tandem heat exchanger vessel to move the liquid fuel upwardly therein and downwardly in the reactor core vessel and unidirectionally around the closed loop, and where means outside of the reactor vessel take heat from the circulating gas to generate useful output.

While the operating temperatures of the reactor are limited ultimately by the structural materials holding the reactor together, and not by the temperature of the fuel itself, the upper limits can be increased now considerably above the 400°–500° C. range of most fission reactors, up to the point almost of vaporization of the liquid uranium fuel. This occurs at atmospheric pressures in the approximate range of 3500° C., but even higher at superatmospheric pressures. Thus the efficiency of power generation can be increased from 30–35% to 50–65% at the 1000°–2500° C. range and up to 75% at temperatures approaching 3500° C.

DETAILED DESCRIPTION OF THE PREFERRED EMBODIMENT

Figure 1:
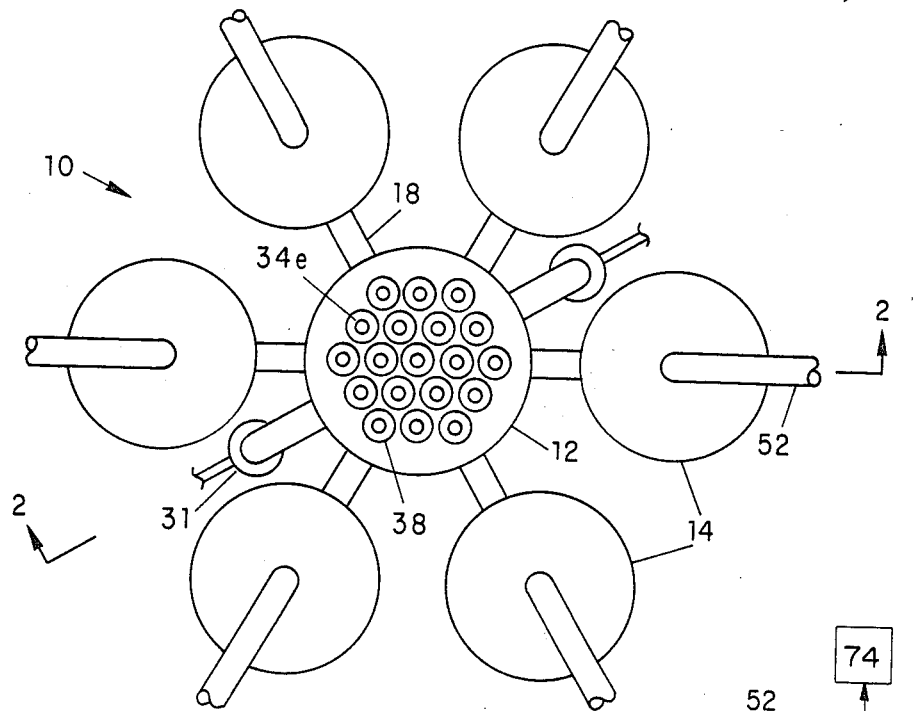
FIG. 1 is a plan view of a nuclear fission reactor formed according to a preferred arrangement of the subject invention.
Figure 2:
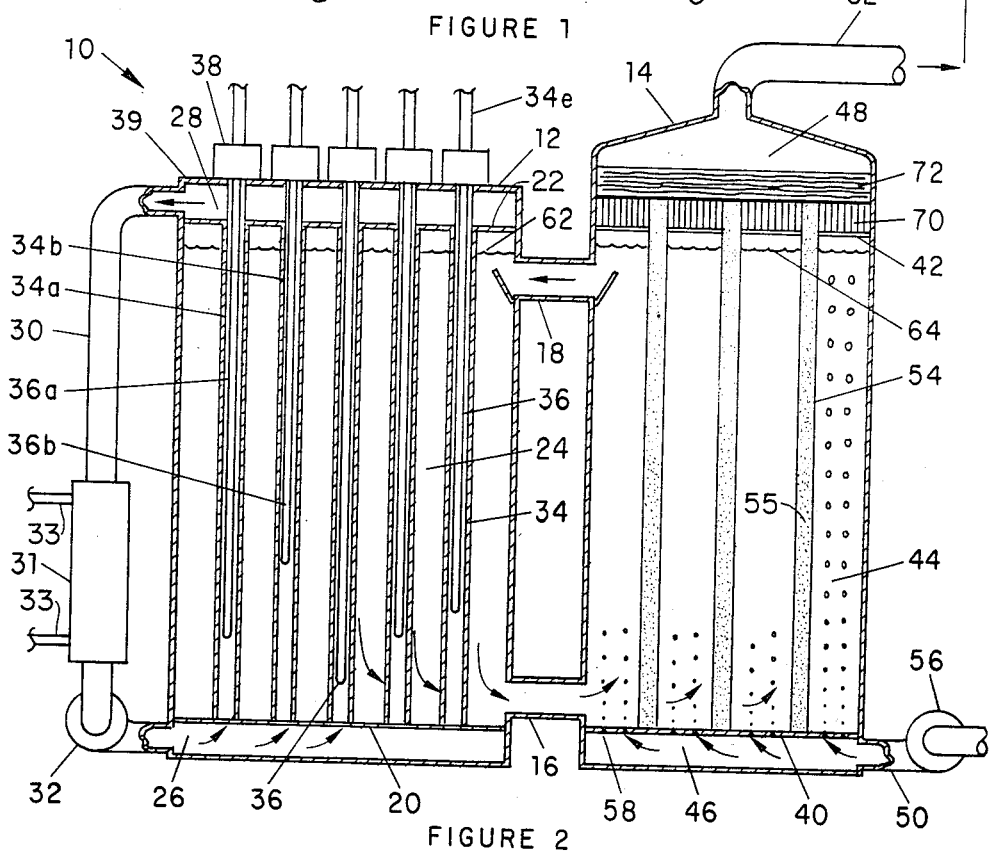
FIG. 2 is an elevational sectional view, as seen generally from line 2—2 in FIG. 1, showing additional details of the subject invention.

In the figures, the reactor 10 is illustrated having a central core vessel 12 and a plurality of outer radially spaced heat exchanger vessels 14 each connected thereto by means of lower and upper cross pipes or passages 16 and 18, respectively. The central reactor core vessel 12 is divided by a pair of cross walls 20 and 22 to define a liquid containment core space 24 between the walls 20 and 22 and lower and upper coolant plenums 26 and 28 defined respectively below the cross wall 20 and above the cross wall 22. The coolant plenums 26 and 28 are interconnected exteriorally of the vessel 12 by a pipe 30 extended through a heat exchanger 31 and a compressor 32, and interiorally of the vessel 12 via a plurality of pipes 34 sealed at their ends to the cross walls 20 and 22. This defines a closed loop coolant confinement, and an inert or noble gas such as helium is sealed in the confinement. Inlet and outlet lines 33 serve to convey a separate fluid through the heat exchanger 31 for maintaining proper coolant temperature, and as a result, proper temperature for the control elements.

A reactor control element 36 is supported within each of the pipes 34 in such a manner as to allow vertical movement therein up or down to varying depths relative to or within the vessel 12 as indicated by the depth of the control elements 36a and 36b within the first two pipes 34a and 34b. The control elements are moved by means of control devices 38 vertically relative to the vessel, the control devices being shown only schematically as any appropriate device of this nature would be appropriate. To accommodate the movement of the control elements vertically beyond or from the vessel, tubes 34e extend upwardly above top wall 39 of the vessel 12 aligned with the pipes 34.

Operation of the compressor 32 thereby circulates the coolant gas over the control elements 36 for cooling the same, and this heat is taken away via the heat exchanger 31 and the separate fluid.

Each vessel 14 also is divided by a pair of cross walls 40 and 42 defining therein a central liquid containment space 44, and lower and upper plenums 46 and 48. Inlet and outlet tubes 50 and 52 are connected to these respective plenums 46 and 48 for conveying a gas as will be more fully explained hereinafter. A plurality of tubes 54 extend between the cross walls 50 and 52, and have a poison or control material 55 therein to negate any nuclear fission reaction in the vessel 14, much the same as the presence of the control or moderator elements 36 negate and control the nuclear fission within the vessel 12. However, it is preferred that the poison material 55 in the tubes 54 be permanently in place, and not adjustable, to preclude any fission reaction in the vessels 14.

In the illustration, nuclear fuel in its liquid phase fills the central core and outer heat exchanger vessels 12 and 14 up to the respective levels 62 and 64, each being at or above the cross passages 18. A coolant gas typically a noble gas (such as helium, neon, or argon which is not affected by a fission reaction) is circulated via the inlet and outlet pipes 50 and 52 through the liquid containment space 44 of the vessel 14. An appropriate compressor 56 of conventional design pressurizing the gas to the levels needed, and outlet nozzles 58 from the lower plenum 46 direct this gas into the liquid fuel as high velocity jets or as bubbles of the gas.

A preferred fissionable nuclear fuel would be uranium as an oxide or as an alloy having a melting temperature of approximately 1132° C. and a vaporization temperature of approximately 3812° C. Thus, the operating temperature of the fuel will be in the range between approximately 1150° and 2500° C. (much less than 3812° C. because of vapor pressure effect) at atmospheric pressures, but could be even higher if superatmospheric pressures were used. The vessels 12 and 14 have to remain structural to contain the liquid fuel without leakage, whereby they and pressure tubes 16 and 18 and pipes 34 and 54 are formed of alumina ($Al_2O_3$) or some other ceramic material having a high melting point, strength at high temperatures, and the capability of being fabricated to the shape and size and thereafter maintaining its structural integrity. It is allowed that some amount of the containment material be dissolved in the liquid fuel up to the saturation point. Thus, the liquid fuel inside the reactor would always consist of the fuel itself and, partly, of containment material.

In the reactor installation, an enlarged radiation barrier or guard vessel (not shown for clarity of disclosure) would be provided around the vessels 12 and 14, and most commonly would be backed itself by earthen back fill or even reinforced concrete. This provides shielding against radiation and thermal heat transfer. Moreover, should there be a failure of either reactor vessel 12 or 14 to allow the leakage of the nuclear fuel therefrom, the same would be trapped by containment structure for purposes of safety.

During the typical reactor operation, the coolant gas, preferably helium, would be directed via pipe 50 under pressure into the lower plenum 46 of each vessel 14, and would be dissipated via the nozzles 58 into the liquid fuel therein and would pass as bubbles upwardly through the column of the liquid therein. This would render the liquid less dense than the liquid in the interconnected vessel 12 to the extend that a head differential across the surface levels 64 and 62 will be established, and via the connecting cross passages 18 and 16, the liquid fuel would flow in an upward direction of the heat exchanger vessels 14 and a downward direction in the core vessel 12. The circulation of the liquid fuel would be unidirectional around this closed liquid fuel circuit or loop.

A condenser separator 70 is located above the cross wall upper 42 and a mechanical separator 72 is located downstream relative to the condenser separator 70 to remove from the gas (helium) passing therethrough any of the liquid fuel droplets that may have picked up by the gas in passing through vessel. The gas passing through the outer heat exchanger vessels 14 would absorb heat from the liquid fuel, and the gas would be directed via outlet line 52 to a bottoming energy producing system of conventional design, such as a gas turbine or a heat exchanger 74. It would be possible perhaps and even desirable to direct some or all of the hot gases through the mentioned gas turbine first and then through the heat exchanger for best utilization of the high temperatures of the gas. In a preferred mode of operation, the helium gases would be pressurized at low inlet temperature by the compressor 56 to a pressure ratio at least three and possibly five or more to one times the pressure at the inlet to the compressor.

The control elements 36 are raised and lowered to determine the extent of the fission reaction in the core vessel 12; and although fission reaction will only occur in the core vessel, it will be on separate and different portions of the liquid fuel contained in the vessels. This will provide for more extended life of the fuel as it is not being irradiated only at some localized areas as is the case with solid fuel. The moderator elements 54 extending throughout the entire length of the vessel 14 would preclude any fission reaction in these vessels. Likewise the connecting liquid fuel connector pipes 16 and 18 would have a moderator element (not shown) of the same type held therein to preclude the generation of a fission reaction in any of these pipe areas caused by the sole presence of the liquid fuel directly. An alternative to the separate pipe arrangement disclosed in the vessel 14 might be a one-piece structure having a matrix array of passages, the structure being formed of the poison or moderator material 55.

This invention thus overcomes many limitations of conventional nuclear fission reactors, namely the low efficiencies imposed by maintaining the reactor within an upper limited temperature of approximately 500° C. With the disclosed arrangement, the nuclear fission reaction is maintained under adjustable control at all times by the control elements 36 being brought into varying presence of the liquid fuel itself within the core vessel 12. Moreover, the extent of movement or circulation of the liquid fuel throughout the coupled vessels 12 and 14, induced by the bubbles or jets of the heat transfer gas, can be varied independently of the control of the control element 36. The circulating liquid fuel also causes different portions of the fuel to be irradiated for improved usage. The fuel circulating gas also serves as the heat transfer medium in extracting and transferring the fission heat to an exterior energy converter.

From a practical point of view, uranium oxide ($U_3O_8$) is a desirable fuel for operating in the range of 1500°–1800° C. Further increases in the operating temperature range up to 2500° C. would be possible, except that uranium above 2000° C. begins to vaporize more rapidly and special equipment will be preferred so as to condense and collect this vaporized uranium. Also, state of the art materials to contain the fuel and control elements and the coolant somewhat limit the practical upper operating temperature to the 1800°–2000° C. range. Other fuels would be possible in the application of this invention, including the following; magnesium-uranium (MgU) for operating in the range of 1200°–1800° C., silicon-uranium (SiU) for operating in a temperature range of 1200°–1600° C., titanium-uranium (Ti-U) for operating in a temperature range of 1400°–1800° C., or zirconium-uranium (ZrU) for a temperature range of 1500°–1800° C.

Each of the above fission fuels would be operated with solid or partly dissolved pieces held in containment of boron (B), beryllium (Be), or boron carbide ($B_4C$), hafnium (Hf), and tantalum (Ta), serving as the control element. These would be appropriate for a fast neutron or breeder reactor. For a slow reactor, the fuel can be any of the above, with graphite serving as the moderator. The containment vessel and other pipes can be formed of silicon or magnesium or different other ceramics being partly dissolved in the liquid fuel.

The embodiments of the invention in which an exclusive property or privilege is claimed are defined as follows:

1. A nuclear fission reactor, comprising a core vessel and a heat exchanger vessel and passage means coupling the vessels together at their respective upper and lower ends to define a continuous loop for the unidirectional flow of a liquid through the vessels, means for supporting and moving a plurality of control elements adjustably within the core vessel operable to vary their relative presence therein, fissionable fuel confined in the liquid phase in the vessels at a depth up to the upper passage means, a lattice of a poison or moderator material in the passages and in the heat transfer vessel to preclude any fission therein, means to admit a heat transfer gas into the lower end of the heat exchanger vessel, said gas thereupon being effective to bubble through the liquid fuel therein and cause said liquid to circulate upwardly in the heat exchanger vessel and downwardly in the cooled core vessel, and means to direct the heat transfer gas from the upper end of the heat exchanger vessel to conventional energy conversion means outside of the reactor heat exchanger vessel.

2. A nuclear fission reactor combination according to claim 1, further including a plurality of solid wall pipes extending through the core vessel and being sealed to the vessel to keep the liquid fuel on the outside of the pipes only, and said control elements being supported respectively in the pipes.

3. A nuclear fission reactor combination according to claim 2, further including means to circulate a coolant within the pipes and over the control elements therein.

4. A nuclear fission reactor combination according to claim 3, wherein said means includes spaced plenums defined at the opposite ends respectively of the pipes that communicate with one another on the one hand through the pipes, additional passage means including heat exchanger and compressor means for communicating the plenums to one another exteriorly of the core vessel and defining a closed loop with the pipes, and said coolant being confined in and circulated through the closed loop for cooling the control elements.

5. A nuclear fission reactor combination according to claim 4, wherein the coolant confined and circulated in the loop is the gas helium.

6. A nuclear fission reactor combination according to claim 1, further including separator means located at the upper end of the heat exchanger vessel in the series flow path of the coolant and above the liquid fuel therein operable to separate any liquid droplets of the liquid fuel from the coolant gas passing outwardly of the heat exchanger vessel to the energy conversion means.

7. A nuclear fission reactor combination according to claim 1, wherein the liquid fuel is uranium oxide ($U_3O_8$), the control element is boron carbide ($B_4C$), and the moderator is graphite.

8. A nuclear fission reactor combination according to claim 7, wherein the fuel is operated at a temperature in the range between approximately 1200° and 2000° C. and said core vessel, said passage means and said heat exchanger vessel in contact with the liquid fuel are comprised of high melting point ceramic materials.

9. A nuclear fission reactor combination according to claim 1, wherein the liquid fuel is silicon uranium (SiU) and, the control element is hafnium (Hf), and the moderator is graphite.

10. A nuclear fission reactor combination according to claim 1, wherein the liquid fuel is magnesium uranium (MgU) and, the control element is tantalum (Ta), and the poison is graphite.

* * * * *